United States Patent [19]

Lee

[11] Patent Number: 4,868,995

[45] Date of Patent: Sep. 26, 1989

[54] APPARATUS AND METHOD FOR MARKING CENTER OF TURNING BILLET

[75] Inventor: Leonard G. Lee, Ottawa, Canada

[73] Assignee: Lee Valley Tools Ltd., Ottawa, Canada

[21] Appl. No.: 181,224

[22] Filed: Apr. 13, 1988

[51] Int. Cl.[4] .............. B23B 49/00

[52] U.S. Cl. .............. 33/672

[58] Field of Search .............. 33/672, 670, 666, 428; 82/45, 903, 40 R

[56] References Cited

U.S. PATENT DOCUMENTS

| | | | |
|---|---|---|---|
| 49,553 | 8/1865 | Safford et al. . | |
| 311,619 | 2/1885 | Varnum . | |
| 316,918 | 4/1885 | Standeford . | |
| 364,082 | 5/1887 | Bell . | |
| 477,959 | 6/1892 | Price | 33/428 |
| 906,180 | 12/1908 | Wrightsman . | |
| 912,052 | 2/1909 | Albertson . | |
| 1,157,589 | 10/1915 | Savage | 33/428 |
| 2,085,461 | 6/1937 | Chafee | 33/428 |
| 2,634,507 | 4/1953 | Boatwright | 33/197 |
| 2,961,773 | 11/1960 | Honn | 33/197 |
| 4,667,549 | 5/1987 | Griffin | 82/40 R |

*Primary Examiner*—William A. Cuchlinski, Jr.
*Assistant Examiner*—Christopher Fulton
*Attorney, Agent, or Firm*—Kilpatrick & Cody

[57] ABSTRACT

A center marker for locating and marking the ends of turning squares or billets prior to mounting them in lathe centers. The marker includes three orthogonal plates which are joined to form a corner, and the base plate is fitted with a knife which protrudes from the base surface in order to mark the billet end when it is brought against the knife while cradling adjacent billet surfaces against arms of the marker.

5 Claims, 1 Drawing Sheet

APPARATUS AND METHOD FOR MARKING CENTER OF TURNING BILLET

BACKGROUND OF THE INVENTION

This invention relates to methods and apparatus for locating and marking the center of turning squares, billets and other objects to be placed in a lathe.

It is desirable in preparing turning squares, wood billets and other objects to be mounted in a lathe for machining to locate on the object the positions on its opposite ends which define between them the line or axis which will be most nearly "centered" within the object. Mounting the turning square or billet so that it rotates about this axis will make it possible to obtain a cylinder or cylindrical section which is as large in diameter as possible for a given turning square or billet and will minimize vibration when the billet is subsequently rotated in the lathe.

For a turning square or billet which has a truely square cross section, the desired center point on each end of the billet lies at the intersection of the two lines which intersect the diagonally opposite corners of the square end surface. This point has traditionally been located and marked in the prior art by positioning a straight edge across the billet end and drawing with pencil or scribing lines between the corners. Frequently, shallow saw kerfs are made on those lines to facilitate engagement of spurs in a lathe drive center. Alternatively, the center point is sometimes located simply by sawing a shallow kerf between each pair of opposite end corners. These techniques are time-consuming and require sometimes awkward manipulation of the turning square or billet and marking instruments. Furthermore, separate layout and marking of each square or billet is required. Consequently, a variety of center marking devices have previously been developed, some of which are intended primarily for use in metal turning and others of which are intended for wood turning. Examples of such devices are represented in U.S. Pat. No. 49,533 to Safford and Sawyer, 311,619 to Varnum, 316,918 to Standeford, 364,082 to Bell, 906,180 to Wrightsman, 912,052 to Albertson and 4,667,549 to Griffon. However, none of these marking devices and techniques provides a simple to manufacture and simple to use device which can rapidly and accurately mark turning squares or billets having a variety of shapes and dimensions without the need for any measurement of the billet or adjustment of the device.

SUMMARY OF THE INVENTION

The present invention is a device for locating and marking the ends of turning squares or billets prior to mounting them in a lathe. The marker includes three orthorgonal plates which are joined to form a "square corner," and one of the plates is fitted with a knife which protrudes from the plate surface and is oriented diagonally in the plate so that the knife forms a forty-five degree (45°) angle with respect to each edge of the knife plate which adjoins one of the other two plates. A turning square or billet end may be marked by resting the end in the marker against the knife so that adjacent billet sides are cradled by the other two plates. The billet is then forced against the knife to leave a diagonal cut across its end. The billet is then rotated ninety degrees (90°), and the end is again forced against the knife to leave an "X" marking the center of the end. As is explained in more detail below, the marker can also be used with previously turned round billets and billets having rectangular cross sections and ends.

The present invention thus provides a center-marking device and technique which very conveniently and simply locates and marks the centers of the ends of turning squares or billets of a variety of shapes and sizes without any need for measurement or adjustment of the marker to accommodate different sizes of stocks.

DETAILED DESCRIPTION OF THE DRAWINGS

Figure 1:
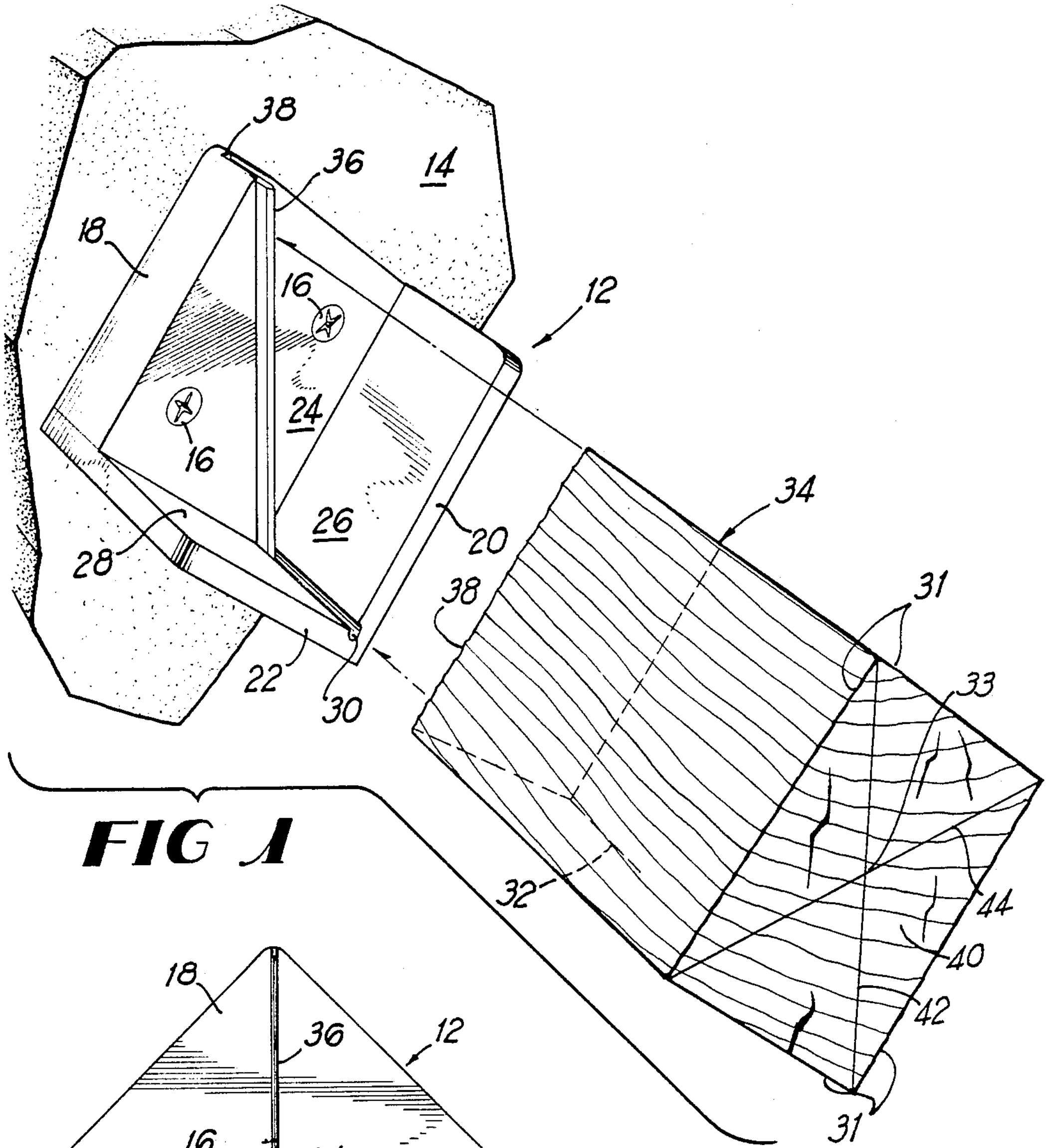
FIG. 1 is a perspective view of the center marker of the present invention shown mounted on a wall together with a turning square or billet which has been marked utilizing the invention.
Figure 2:
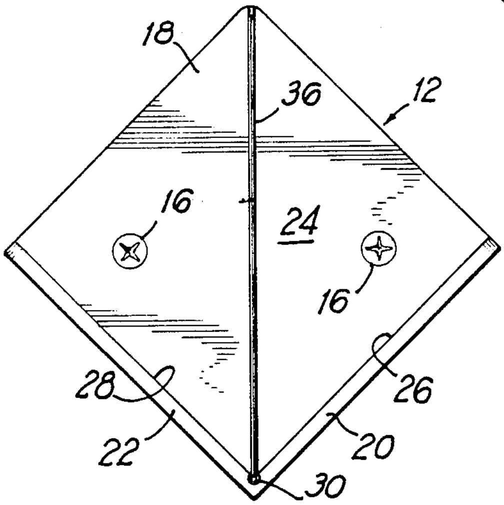
FIG. 2 is a front elevation of the center marker shown in FIG. 1.

FIG. 1 illustrates the center marker 12 of the present invention mounted on a wall 14 using screws 16 which pass through its base 18 and into the wall 14. The marker includes a square base 18 to which arms 20 and 22 are attached. Functionally, arms 20 and 22 should be plates mounted at right angles to each other and at a right angle to the base 18, so that each of (a) base 18 surface 24, (b) plate 20 surface 26 and (c) plate 22 surface 28 is orthogonal to each other surface. Arms 20 and 22 may be formed of separate plates or, as is illustrated in FIGS. 1 and 2, may be a single member formed, for instance, from an aluminum extrusion. In the embodiment illustrated in FIGS. 1 and 2, an "engineer's corner" 30 is provided between arm 20 surface 26 and arm 22 surface 28 by providing a small groove 30 between surfaces 26 and 28 so that the surfaces do not quite meet. Such a groove 30 insures that minor irregularities in or protrusions from the edge 32 of turning square or billet 34 will not prevent billet 34 from seating squarely in the center marker 12 during its utilization as further explained below.

A knife 36, which may be a steel rule die with a double bevel, is received in a slot 38 in base 18 so that the edge of knife 36 protrudes from but is parallel to base 18 surface 24. Slot 38 is oriented in base 18 so that knife 36 forms a forty-five (45°) angle with respect to each edge of the base 18 which adjoins arm 20 or arm 22. Base 18 may be peened immediately adjacent to slot 38 after knife 36 has been inserted in order to affix knife 36 in the slot 38, or other appropriate conventional fastening means may be used. Screws (not shown) which pass through arms 20 and 22 into base 18 or other conventional fastening means may be utilized to affix base 18 to arms 20 and 22. As is illustrated in FIGS. 1 and 2, screws 16 may be used to affix center marker 12 to a wall, bench top or other surface when marking is to be accomplished by application of pressure to the billet 34. Alternatively, center marker 12 may also be used without mounting it on another surface.

As will be readily understood by reference to FIG. 1, center marker 12 is used by cradling the end 38 of billet 34 in the marker 12 against arms 20 and 22. Billet 34 is then tapped with a mallet, hammer or other appropriate object on the opposite end 40 in order to drive end 38 into knife 36, thereby leaving a diagonal mark like mark 42 shown on end 40. Billet 34 is then rotated 90° about its longitudinal axis, end 38 is again inserted in center marker 12, and the previously described operation is repeated in order to form a second mark similar to the mark 44 shown on end 34.

The resulting marks, like marks 42 and 44, intersect at the exact center 33 of the end 38 or 40 of a turning square or billet 34 having a square cross section and an end 40 which is square with respect to the billet 34 sides 31.

Figure 3:
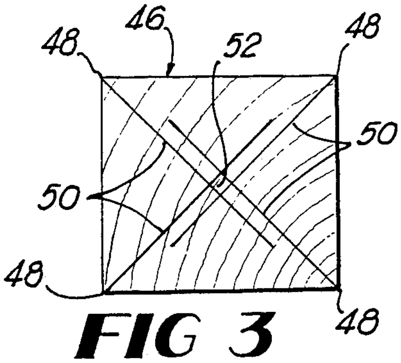
FIG. 3 is an end elevation view of a turning square or billet having a rectangular cross section which has been marked utilizing the center marker illustrated in FIG. 1.

Although it is normally desirable to "square" billets 34 so that they have a square cross section before lathe center locations are marked and turning on the lathe is initiated or waste material is ripped off before turning is initiated, the center marker 12 of the present invention may also be utilized to assist in locating the center of billets having a slightly rectangular cross section such as the billet 46 illustrated in FIG. 3. As will be readily apparent by reference to FIG. 3, the end of such a rectangular billet may be marked by repeating the above-described operation four times with each of the four edges 48 alternatively located adjacent to the engineer's corner 30 of center marker 12. This will result in lines 50 which define a small square region 52 in the center of the end of billet 46. Lathe centers can then be located in the center of the square region 52 with assurance that doing so will cause billet 46 to rotate in the lathe about its center-most longitudinal axis.

As will be readily appreciated, it is not necessary for the marks left by knife 36, such as lines 42 and 44, to extend beyond the point on the billet end 40 of billet 34 where the marks intersect. Accordingly, the center marker 12 of the present invention can be successfully used to mark billets as large in cross-sectional dimensions as those having edge-to-edge measurements slightly less than twice the length of knife 36. However, if the marks 42 and 44 on a square billet 34 do extend beyond their intersection 33 on each side at least the radius of the lathe drive center being used, it is often possible to impress the marks deeply enough to permit them to be engaged by the spurs of a lathe drive center, obviating the need for saw kerfs and thereby substantially increasing the accuracy of centering.

As will similarly be appreciated by one of ordinary skill in the art, the center marker 12 of the present invention can be utilized to relocate the center of ends of round billets, including spindles or other objects which have previously been turned on a lathe and the center markings for which have been lost as a result of the removal of waste material or otherwise. Marking of such round billets is accomplished as described above except that it is not, of course, necessary to rotate the billet precisely 90° between markings as occurs automatically when marking a billet 34 having a square cross section.

As mentioned above, center marker 12 may also be used without mounting the marker by transporting the marker to a stationary billet 34 rather than vice versa and then tapping the back of marker base 18 in order to impress knife 36 into the billet end.

The foregoing description of the present invention is provided for the purposes of explanation and illustration of a preferred embodiment of the invention. Modification may be made to the disclosed embodiment without departing from the scope or spirit of the invention.

I claim:

1. A center marker for marking a lathe center location on a billet, comprising two arms for receiving and cradling adjacent billet sides, a knife mounted to bisect the angle between the two arms so that the billet may be pressed against the knife and a means for mounting the marker on a stationary surface.

2. A center marker for marking a lathe center location on a billet, comprising a base and two planar arms having billet contact surfaces which arms are mounted on and orthogonal to a base and orthogonal to each other, a knife mounted on the base at a 45 degree angle to each of the base edges adjacent to the arms and a means for mounting the marker on a stationery surface.

3. A center marker in accordance with claim 2 wherein the billet contact surfaces of the arms do not intersect, thereby providing relief between such surfaces.

4. A center marker for marking a lathe center location on a billet, comprising:

(a) a metal base, (b) a metal extrusion mounted on the base, which extrusion has two orthogonal arms formed by two plates oriented at a right angle to each other and an engineer's corner between the plates and (c) a knife mounted in the base at a 45° angle to each of the orthogonal arms so that its edge protrudes from and is parallel to the base surface.

5. A method for locating and marking a lathe center position on an end of a billet having a square cross section, four sides and two ends, comprising the steps of:

(a) positioning one end of the billet against a knife edge by bringing two adjacent sides of the billet in contact with two orthogonal planar reference surfaces adjacent to the knife edge, (b) striking the other end of the billet in order to force it against the knife edge and mark the billet end in contact with the knife edge, (c) rotating the billet 90° about its longitudinal axis, and (d) repeating steps (a) through (c).

* * * * *